United States Patent [19]

Handschy et al.

[11] Patent Number: 5,347,378
[45] Date of Patent: Sep. 13, 1994

[54] FAST SWITCHING COLOR FILTERS FOR FRAME-SEQUENTIAL VIDEO USING FERROELECTRIC LIQUID CRYSTAL COLOR-SELECTIVE FILTERS

[75] Inventors: Mark A. Handschy; Linden Stuart, III, both of Boulder, Colo.; Hugh Masterson, Churchtown, Ireland

[73] Assignee: Displaytech, Inc., Boulder, Colo.

[21] Appl. No.: 47,348

[22] Filed: Apr. 19, 1993

Related U.S. Application Data

[63] Continuation of Ser. No. 678,876, Apr. 4, 1991, abandoned.

[51] Int. Cl.$^5$ .................. G02F 1/13; G02F 1/133; G02F 1/1335
[52] U.S. Cl. ...................... 359/53; 359/73; 359/100
[58] Field of Search ............ 359/98, 53, 64, 73, 359/100

[56] References Cited

U.S. PATENT DOCUMENTS

| | | | |
|---|---|---|---|
| 4,025,164 | 5/1977 | Doriguzzi et al. | 359/64 |
| 4,367,924 | 1/1983 | Clark et al. | 359/56 |
| 4,394,069 | 7/1983 | Kaye | 359/53 |
| 4,416,514 | 11/1983 | Plummer | 359/53 |
| 4,448,823 | 5/1984 | Clifford | 359/53 |
| 4,497,543 | 2/1985 | Aoki et al. | 359/64 |
| 4,563,059 | 1/1986 | Clark et al. | 359/76 |
| 4,582,396 | 4/1986 | Bos et al. | 359/64 |
| 4,711,530 | 12/1987 | Nakanowatari et al. | 359/63 |
| 4,770,500 | 9/1988 | Kalmanash et al. | 359/53 |
| 4,834,508 | 5/1989 | Fergason | 359/51 |
| 4,867,536 | 9/1989 | Pidsosny et al. | 359/64 |
| 5,033,825 | 7/1991 | Ishikawa et al. | 359/73 |
| 5,089,905 | 2/1992 | Sasaki et al. | 359/64 |
| 5,126,864 | 6/1992 | Akiyama et al. | 359/63 |
| 5,132,826 | 7/1992 | Johnson et al. | 359/63 |

FOREIGN PATENT DOCUMENTS

| | | | |
|---|---|---|---|
| 0179417 | 8/1986 | Japan | 359/98 |
| 3036526 | 2/1991 | Japan | 359/64 |

OTHER PUBLICATIONS

"Ferroelectric Liquid Crystal Materials Applied to Guest–Host Type Displays," *Ferroelectrics*, 1988, vol. 85, pp. 361–373, K. Kondo et al.
D. J. A. Grant, B. M. Nicholas and M. C. K. Wiltshire, "An A5 Ferroelectric Liquid Crystal Two Colour Shutter," Abstract, p. 48, Second Int. Conf. on Ferroelectric Liquid Crystals, Sweden, Jun. 27–30, 1989.
H. J. Masterson, G. D. Sharp, K. M. Johnson, "Ferroelectric liquid–crystal tunable filter", Optics Letters, vol. 14, No. 22, Nov. 1989, pp. 1249–1251.
N. A. Clark, M. A. Handschy, S. T. Lagerwall, "Ferroelectric Liquid Crystal Electro–Optics Using the Surface Stabilized Structure," Mol. Cryst. Liq. Cryst., 1983, vol. 94, pp. 214–234.
K. Sharp, M. A. Handschy, "Ferroelectric Liquid Crystals, Material Properties and Applications," Mol. Cryst. Liq. Cryst., 1988, vol. 165, pp. 439–509.
Billings, "A Tunable Narrow–Band Optical Filter", Journal of the Optical Society of America, vol. 37, No. 10, Oct. 1947, pp. 738–746.

(List continued on next page.)

*Primary Examiner*—William L. Sikes
*Assistant Examiner*—Anita Pellman Gross
*Attorney, Agent, or Firm*—Cushman, Darby & Cushman

[57] ABSTRACT

A frame-sequential color video system and color-selective filters for use in the same. The color-selective filters of the invention have fast response, and can be switched between the three primary colors of red, green, and blue. Switching between the three primary colors is achieved by selective absorption, or by selective interference, which is controlled by the switching of specific device combinations. A frame-sequential color display system is achieved by combining such a color-selective filter with a fast-switching black and white video display, which can be either emissive or reflective. A frame-sequential color camera system is achieved by combining such a color-selective filter with a fast-responding black and white video camera.

52 Claims, 8 Drawing Sheets

OTHER PUBLICATIONS

Cotter et al., "Ferroelectric-Liquid-Crystal/Silicon-Integrated-Circuit Spatial Light Modulator" 1990 Optical Society of America, pp. 291-293.

Haven, "Reinventing the Color Wheel", Information Display Jan. 1991, pp. 11-15.

Yeh, "Optical Waves in Layered Media" pp. 270-277 1948.

Sharp et al. "Smectic Liquid Crystal Tunable Filters", Ferroelectrics, 1991, vol. 114, pp. 55-69.

Patel et al., "Alignment of Liquid Crystals which Exhibit Cholestreric to Smectic C* Phase Transistions", J. Appl. Phys. 59(7), Apr. 1986, pp. 2355-2360.

Williams et al. "Picosecond All-Optical Logic Gate in a Nonlinear Organic Etalon", Appl. Phys. Lett. 57(23), Dec. 1990, pp. 2399-2401.

Ishihara et al., "Preparation and Properties of Optical Notch Filters of Cholesteric Liquid Crystals", Polymer, Dec. 1988, vol. 29, pp. 2141-2145.

Evans, "Solc Birefringent Filter", Journal of the Optical Society of America, 3/1958m vol. 48, No.3, pp. 142-145.

Evans, "The Birefringent Filter", Journal of the Optical Society of America, Mar. 1949, vol. 39, No. 3, pp. 229-242.

Hartmann, "Ferroelectric Liquid-Crystal Video Display", IEEE Transactions on Electronic Devices, Sep. 1989, vol. 36, No. 9, pp. 1895-1899.

Buhrer, "Four Waveplate Dual Tuner for Birefringent Filters and Multiplexers", Applied Optics, Mar. 1987, vol. 26, No. 17, pp. 3628-3632.

Harris et al. "Acousto-Optic Tunable Filter", Journal of the Optical Society of America, Jun. 1969, vol. 59, No. 6, pp. 744-747.

Solc, "Birefringent Chain Filters", Journal of the Optical Society of America, Jun. 1965, vol. 55, No. 6, pp. 621-625.

Anderson et al., "Submicrosecond Electro-Optic Switching in the Liquid-Crystal Smectic a Phase: The Soft-Mode Ferroelectric Effect", Appl. Phys. Lett., Aug. 1987, vol. 51, No. 9, pp. 640-642.

Sharp et al., "Continuously Tunable Smectic A* Liquid-Crystal Color Filter", Optical Society of America, May 1990, vol. 15, No. 10, pp. 523-525.

Scheffer, "New Multicolor Liquid Crystal Displays That Use a Twisted Ematic Electro-Optical Cell", J. Appl. Phys., Nov. 1973, vol. 44, No. 11, pp. 4799-4803.

Lotspeich et al., "Electro-Optic Tunable Filter", Optical Engineering, Nov. 12, 1981, vol. 20, No. 6, pp. 830-836.

Title, "Tunable Birefringent Networks", Active Optical Devices, 1979, vol. 202, pp. 47-53.

White, "Colour LCD TV", Phys. Technol., 1968, vol. 19, pp. 91-100.

FAST SWITCHING COLOR FILTERS FOR FRAME-SEQUENTIAL VIDEO USING FERROELECTRIC LIQUID CRYSTAL COLOR-SELECTIVE FILTERS

This invention was made with Government support under Contract No. NAS-9-18091, awarded by the National Aeronautics and Space Administration. The Government has certain rights to this invention.

This is a continuation of application Ser. No. 07/678,876, filed on Apr. 4, 1991, which was abandoned upon the filing hereof.

BACKGROUND OF THE INVENTION

1. Field of the Invention

This invention is in the field of frame-sequential color video systems, which are systems for sensing or displaying color video images wherein the system senses or displays images in one of the three primary colors after another. Such systems can be realized using color-selective filters, by which we mean any optical filter which transmits or reflects a certain portion of the visible spectrum and can be switched between any number of predetermined colors. Our invention teaches filters which have the ability to switch discretely between the three primary colors of red, green, and blue by employing the electro-optic properties of the Surface Stabilized Ferroelectric Liquid Crystal (SSFLC) device. Such color-selective filters employing SSFLC devices have the required response time for use in frame-sequential color video, where an arbitrary color is "mixed" from appropriate intensities of each of the three primary colors; each color being presented as a time-sequential image frame. The frame-sequential color scheme can equally-well be used for video cameras or video displays.

2. Description of the Prior Art

Color-selective filters useful for frame-sequential color video systems are known in the prior art. Such devices have relied usually on a mechanical, electro-mechanical, or electro-optical tuning means. The simplest example of the former comprises a rotating wheel with various color filters which can be passed in front of an aperture. A Lyot filter, described by John W. Evans, "The Birefringent Filter," J. Opt. Soc. Am.39, 229 (1949), which is well known in the literature, has been demonstrated by Billings, (Bruce H. Billings, "A Tunable Narrow-Band Optical Filter," J. Opt. Soc. Am. 37, 738 (1947)), which can be mechanically tuned through a color range by altering the thickness of stretchable polymer layers which serve to modulate the optical thickness of the filter stages. More recently, Title et al., (A. M. Title and W. J. Rosenberg, "Tunable birefringent networks," Active Optical Devices, Proc. SPIE 202, 48 (1979)), have developed an electro-mechanical method of continuously tuning the Lyot filter by means of rotating half wave-plates inside each filter stage. They have also applied the same means, later refined by Buhrer et al., (C. F. Buhrer, "Four waveplate dual tuner for birefringent filters and multiplexers," Appl. Opt., 26, 3628 (1987)), for color tuning of a Solc filter, (I. Solc, "Birefringent Chain Filters," J. Opt. Soc. Am., 55, 621 (1965); John W. Evans, "Solc Birefringence Filter," J. Opt. Soc. Am. 48, 142 (1958)), also well known in the literature. Such mechanical or electro-mechanical tuning methods are unsuitable for display applications because of their slow response, even when driven electrically, and because of the bulkiness of a device which relies on the above tuning means.

Billings (Billings, op tit.) has suggested a means of electro-optically tuning a Lyot filter by employing Kerr cells in each stage of the filter. An electric field applied to the Kerr cells causes an induced birefringence which alters the optical thickness of the filter stages and the resultant peak transmission is shifted in wavelength. This device is fast enough to be suitable for display applications, even for frame-sequential color displays which require at least a 10 ms response time per frame. Billings proposed a design giving the three primary colors of red, green, and blue with the above system. A Solc type filter has been demonstrated by Harris et al. (S. E. Harris, and R. W. Wallace, "Acousto-Optic Tunable Filter," J. Opt. Soc. Am., 59, 744 (1969)), which is tuned from 400 nm to 700 nm by varying the frequency of an acoustic wave propagating collinearly with the optical signal along a crystal of $LiNbO_3$. The passband of this filter is extremely narrow, being about 0.04 nm, and the angular aperture is also small, being about 15°. The resulting low light levels and narrow viewing cone of such a filter make it unsuitable for display applications. A filter similar to the above, but in which a Solc type geometry is induced by means of an array of DC voltage levels along the length of a $LiTaO_3$ crystal, was demonstrated by Lotspeich et al. (J. F. Lotspeich, R. R. Stephens, and D. M. Henderson, "Electro-Optic Tunable Filter," Opt. Eng., 20, 830 (1981)). Color tunability across the visible spectrum is achieved by varying the voltage levels.

Color-selective filters employing active liquid crystal elements (most of them nematic liquid crystals) are well known in the prior art. Such filters usually rely on the selective absorption or the selective interference of light as the basis for generating color. One such filter of the former type, disclosed in U.S. Pat. No. 4,770,500, employs liquid-crystal quarter-wave cells and a passive quarter wave-plate to rotate by 90° orthogonally polarized green and red light from a pleochroic polarizer, and to transmit one of these colors, or a combination color through a linear polarizer. As this device is restricted to only two primary colors, it is clearly unsuitable for full color display applications. Another such device, called the "field sequential color converter," (M. G. Clark, and I. A. Shanks, Proc. SID Symp. Dig. 172 (1982)) again employs pleochroic polarizers to orthogonally polarize green and red light from a CRT (cathode-ray tube) and uses a twisted nematic (TN) liquid crystal cell to transmit either color through a linear polarizer. The above filter can also be extended to a three color system as is taught in U.S. Pat. No. 4,416,514. A variation on the above, disclosed in U.S. Pat. No. 4,582,396, uses a nematic liquid crystal "Pi-cell" in place of the TN cell and has the ability to switch between colors at a significantly faster rate (5 ms). This latter variation if extended to a full color system, could be employed in frame-sequential color displays, as described by Haven, (Thomas J. Haven, "Reinventing the color wheel," Information Display, 7, 11 (1991)). U.S. Pat. No. 4,867,536 teaches a color-selectable liquid-crystal display system which employs TN cells and pleochroic polarizers to transmit one of a selection of colors. The system operates much on the same principles as the field-sequential color converter with the addition of employing a display cell with patterned electrodes to enable colors to appear on a black or white background. Similar devices, again employing TN cells and pleochroic polarizers, are disclosed in U.S. Pat. Nos. 4,025,164, 4,497,543, and 4,416,514. A full-color filter employing three zero-twist nematic (ZTN) guest-host cells and a neutral polarizer, has been developed by Uchida et al., (T. Uchida, H. Seiki, C. Shishido, and M. Wada, Proc. SID 22, 41 (1981)). The device operates on the principal of subtractive color mixing, and each of the three ZTN cells is doped with a pleochroic dye suitable for this end.

The prior art shows many examples of using active liquid crystal elements in color-selective interference filters. Scheffer (T. J. Scheffer, "New multicolor liquid crystal displays that use a twisted nematic electro-optical cell," J. Appl. Phys., 44, 4799 (1973)), has developed a color-selective filter which consists of a twisted nematic electro-optical cell and birefringent plate, placed between parallel polarizers. The liquid crystal cell, upon application of an electric field, serves to modulate the spectral transmission of the filter. A two-color filter is obtained with the arrangement described, while four colors can be obtained if two such "filter stages" are cascaded together. Three of the four above colors demonstrated by Scheffer were the primaries of red, green, and blue. A color-selective filter with zero-twist nematic cells as voltage-controllable retarders in a Lyot filter arrangement is disclosed in U.S. Pat. No. 4,394,069. The device is similar to the one developed by Billings in that an electrically induced birefringence change in the ZTN cells changes the design wavelength of the filter thus allowing for continuous tuning between colors. The use of ZTN cells however, renders this filter slower than the one demonstrated by Billings.

Nematic liquid crystals have several advantages for use in color-selective filters, namely, they exhibit large modulations for relatively small changes in applied voltage and their operation consumes very little electrical power. However, nematic liquid crystals respond to changes in the magnitude and not the polarity of an applied electric field. Therefore although they can be switched rapidly in one direction by an applied field, they are switched in the opposite direction by removing the field and their response time, governed by relatively slow elastic restoring forces, is limited to about 20 ms. Such a response time is much too slow for frame-sequential color displays where the overall picture color is "mixed" in time-sequential frames of the three primary colors. Current nematic liquid crystal displays "mix" the picture color spatially from a miniature triad of three primary color filters. This spatial arrangement suffers from poorer picture resolution when compared to the temporal one. For frame-sequential display applications, a liquid crystal is needed which responds in less than the 10 ms required for a "flicker free" display. Ferroelectric liquid crystals (FLC's), responding to the polarity and magnitude of an applied electric field, switch in the 100 us regime which is easily fast enough for the above requirement. A frame-sequential color display system was pointed out by White (J. C. White, "Color LCD TV," Phys. Technol., 19, 91 (1988)), where he suggested the use of fluorescent tubes with rapidly decaying phosphors as a means for color-sequential backlighting of an FLC monochrome display.

As is the case with TN cells, surface-stabilized ferroelectric liquid crystal (SSFLC) devices, which have been well documented in the literature, (K. Skarp, M. A. Handschy, "Ferroelectric liquid crystal material properties and applications," Mol. Cryst. Liq. Cryst., 165, 439 (1988); N. A. Clark, M. A. Handschy, and S. T. Lagerwall, Mol. Cryst. Liq. Cryst., 94, 213 (1983)) can also be used in conjunction with pleochroic dyes or birefringent elements, to generate color. A liquid crystal device, employing a ferroelectric liquid crystal cell and a birefringent film, placed between parallel or crossed polarizers, is disclosed in U.S. Pat. No. 4,711,530. This device employs the selective interference of light to improve the display quality of the liquid crystal cell by suppressing a range of transmitted colors. A method of fabricating a wavelength-selective filter by incorporating SSFLC devices in a Lyot filter is taught by Masterson et al. (H. J. Masterson, G. D. Sharp, and K. M. Johnson, "A Ferroelectric Liquid Crystal Tunable Filter," Opt. Lett., 14, 1249 (1989). The ability to operate the SSFLC devices as switchable waveplates is employed to modulate the retardation of each stage of the filter and so alter the range of transmitted wavelengths. This paper describes a canonical Lyot filter, which is made up of several stages of retarders between crossed polarizers, with the optical retardance of each stage being twice that of the previous stage. This paper further teaches that the nth stage of the Lyot filter requires $2^{n-1}$ FLC devices. Hence, the three-stage Lyot filter demonstrated in this paper required seven FLC devices. The filter was used to demonstrate switching between two different spectral bands. This type of filter, when implemented with two or more stages, could give adequate color saturation for frame-sequential video applications, but the number of FLC devices required, produces a complex and expensive filter that is difficult to manufacture.

A continuously tunable filter employing a smectic A* liquid crystal electroclinic cell, (G. Andersson, I. Dahl, P. Keller, W. Kuczynski, S. T. Lagerwall, K. Skarp, and B Stebler, "Submicrosecond electro-optic switching in the liquid crystal smectic A* phase: The soft mode ferroelectric effect," Appl. Phys. Lett., 51, 640 (1987)) has been demonstrated by Sharp et al. (G. D. Sharp, K. M. Johnson, and D. Doroski, "Continuously tunable smectic A* liquid crystal color filter," Opt. Lett., 15, 523 (1990)). The filter employs an electroclinic cell in conjunction with a birefringent element and quarter wave-plate, placed between parallel polarizers, to continuously tune the transmission across a portion of the visible spectrum. Although the filter can be tuned rapidly in <100 ns, it is only operable in a very narrow, controlled temperature range. Furthermore, it does not have a wide enough tuning range to include the three additive primary colors. It is therefore unsuitable for display applications.

SUMMARY OF THE INVENTION

The principal object of the present invention is to provide frame-sequential color video systems and color-selective filters for use in the same. The color-selective filters of the invention have fast response, and can be switched between the three primary colors of red, green, and blue. The response time is governed by the switching speed of the SSFLC devices which is easily faster than the 10 ms required for video systems operating at the conventional rate of 30 full-color frames per second. Switching between the three primary colors is achieved by selective absorption, or by selective interference, which is controlled by the switching of specific SSFLC device combinations. A frame-sequential color display system is achieved by combining such a color-selective filter with a fast-switching black and white video display, which can be either emissive or reflective. A frame-sequential color camera system is achieved by combining such a color-selective filter with a fast-responding black and white video camera.

The switchable color filters disclosed herein are divided on the basis of whether they use selective absorption or selective interference to produce three primary colors from incident white light. The absorption filters are further divided into two classes. The first uses so-called guest-host liquid crystal devices wherein the liquid crystal (the host) is doped with a pleochroic dye (the guest) whose absorptance depends not only on light wavelength, but also on the light polarization relative to the liquid crystal orientation. By causing light to pass through a combination of three such guest-host devices, each one containing a dye absorbing in a different wavelength spectrum, it is possible to construct a filter that can be switched between three primary-color states, depending on the selected states of the liquid crystal devices. The second class of absorption filters relies on the wavelength-dependent absorption of pleochroic polarizers. By interposing liquid crystal devices which act as switchable polarization rotators between combinations of polarizers effective over different portions of the wavelength spectrum, it is again possible to construct filters switchable between the primary colors.

The interference filters of the present invention are also further divided into two classes based on whether they employ one or two stages, each stage comprising a pair of polarizers with a combination of liquid crystal devices and fixed birefringent elements in between. Each filter, whether one-stage or two-stage, employs a total of exactly two SSFLC devices. This is the smallest number of binary devices which can produce a filter with three states. The actual total number of states is, of course, four, one of which either not useful or is redundant. This may be contrasted with the canonical Lyot filters of the prior art, which were designed to produce narrow-band responses. To construct a two-stage filter in accord with this prior-art teaching would require a minimum of four SSFLC devices, two in each stage, to keep the required 2:1 retardance ratio between stages as the filter was switched through its various states. Furthermore, the simplest filters that could be made according to teachings of the prior art, the one-stage filters, would not provide a narrow enough spectral response to give good color saturation. Thus, the filters made in accord with the all the selective-interference embodiments of the present invention offer a superior performance with fewer elements and simpler construction than those disclosed in the prior art.

BRIEF DESCRIPTION OF THE DRAWINGS

FIG. 4 shows the generalized structure of the color-selective interference filter:

FIG. 6(a) shows a color video camera,

FIG. 6(b) shows an emissive color video display employing a black and white CRT, FIG. 6(c) shows a transmissive color video display employing black and white liquid crystal display, and FIG. 6(d) shows a reflective color video display employing black and white liquid crystal display.

DESCRIPTION OF THE PREFERRED EMBODIMENTS

Color-selective Absorption Filters

We outline two means herein of fabricating a fast switching filter which generates the primary colors by selective absorption of white light.

1. Multilayer Guest-host Filter

In the first case we describe a means of generating color in a multilayer guest-host filter consisting of a combination of three SSFLC cells and a linear polarizer. A liquid crystal is chosen to enable the SSFLC cell optic axes to be switched between two states differing in orientation by approximately 90°, and each cell is doped with a pleochroic dye which selectively absorbs in one of the states. The pleochroic dyes are chosen to enable the filter to transmit either the subtractive primary colors of cyan, magenta, and yellow, or the additive primary colors of red, green, and blue. We adopt the terminology that a mixture of more than one pleochroic dyes will also be referred to as a pleochroic dye.

Figure 1:
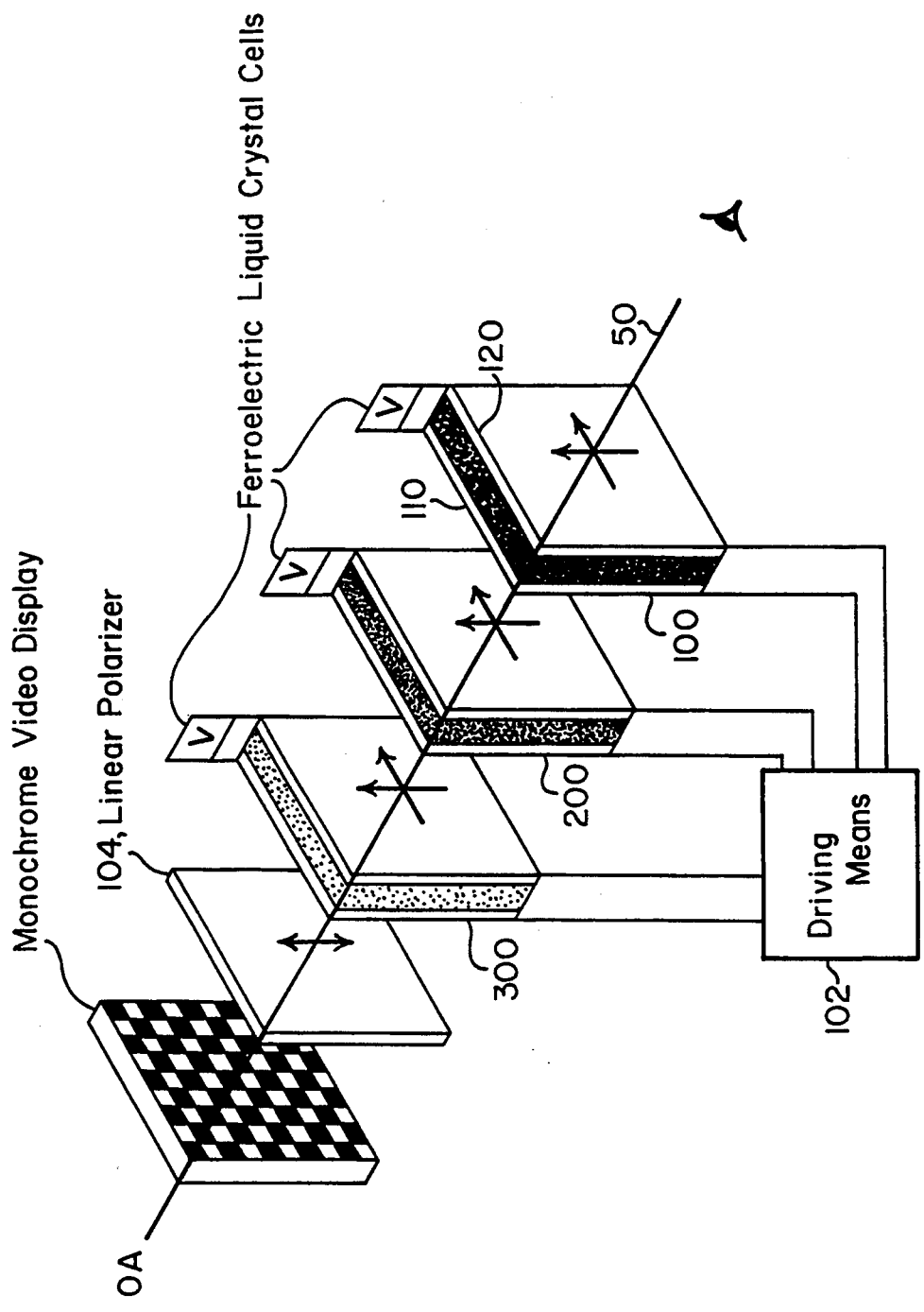
FIG. 1 shows the structure of the multilayer guest-host color-selective filter.

FIG. 1 shows the basic structure of the multilayer guest-host color filter. Three liquid crystal cells, 100, 200 and 300, typically made of glass substrates coated with indium-tin oxide (ITO) transparent electrodes 110, 120 on their facing surfaces, are arranged optically in series along reference axis 50. In each cell, the few-micron-thick gap between each pair of facing electrodes contains a uniformly aligned 45° tilt angle smectic C* FLC. Each of the three liquid crystal cells is oriented with its alignment direction parallel to a reference vertical. Leads connect each set of facing electrodes 110, 120 to a terminal of an electrical driving means 102 which can independently switch each SSFLC cell. A linear polarizer 104 is placed adjacent to one end of the composite of SSFLC cells, with its axis parallel to the reference vertical. The filter may be illuminated from either end. The liquid crystal in each cell is doped with one or more pleochroic dyes which together selectively absorb light of a given wavelength region which is polarized parallel to the long axis of the dye molecule. All wavelengths are transmitted for light polarized perpendicular to this axis. The guest dye molecules orient themselves parallel to the liquid crystal host molecules and can be switched through 90° along with the liquid crystal host molecules when an electric field is applied. The dyes are chosen so the three liquid crystal cells can transmit red, green, and blue light respectively, or, cyan, magenta, and yellow light respectively. In the former case the primary colors are additive and only one liquid crystal cell is switched at a given time to transmit a primary color. In the latter case the primary colors are subtractive and two liquid crystal cells must be switched together to give a resulting primary color which is additive. In both cases, a frame-sequential video system would generate an arbitrary color in time-sequential frames of the additive primary colors. The dye concentrations and cell thicknesses are chosen for maximum saturation of the primary colors while maintaining a desired level of brightness at the output.

Pleochroic Dyes

The use of liquid crystals doped with pleochroic dyes to make guest-host light modulating devices is well known in the art. Most of the dyes taught in the prior art will be suitable for incorporation into FLC guest-host devices, even if the original teaching referred to their incorporation into nematic rather than smectic liquid crystals. In particular, U.S. Pat. No. 4,834,508 to Fergason teaches the use of Sudan-I as a yellow dye, of Indophenol Blue as a cyan dye, and of D-37 from the British Drug House as a magenta dye; these dyes could be used to make the subtractive-color embodiment of the present invention described above wherein two cells are simultaneously switched to their absorbing state to cause transmission of one additive color. Fergason also teaches here that a green dye may be formed as a mixture of yellow dye and a cyan dye. It follows obviously that a red dye may be formed as a mixture of magenta dye and a yellow dye, and that a blue dye may be formed as a mixture of a cyan dye and a magenta dye. These mixtures could be used the additive-color embodiment of the present invention described above wherein only one cell at a time is switched into its absorbing state.

Other dyes known to those in the art may offer advantages such as better color saturation, or improved solubility in smectic liquid crystals. The following dyes are particularly advantageous:

the blue dye, 7-[4-[(4-hexyloxyphenyl)azo](napthyl)azo-(2,3-dihydro-1,3-dimethyl-2-octyl)] perimidine, with the structure given below,

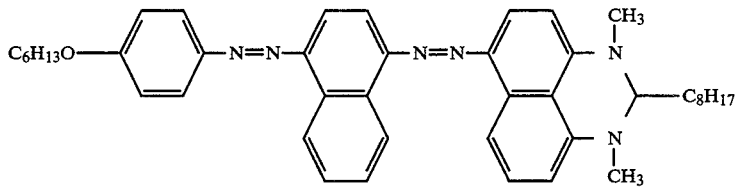

as recited by V. S. Williams, et al. (V. S. Williams, Z. Z. Ho, N. Peyghambarian, W. M. Gibbons, R. P. Grasso, M. K. O'Brien, P. J. Shannon, and S. T. Sun, "Picosecond all-optical logic gate in a nonlinear organic etalon," Appl. Phys. Lett. 57, 2399 (1990));

the red dye with the bisazohexyloxy perimidine structure given below,

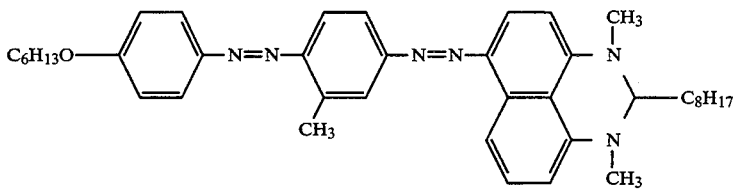

as taught by P. J. Shannon in European Patent Application No. 406,812 (Jan. 9, 1991);

and the yellow dye with the bisazohexyloxy phenol structure given below,

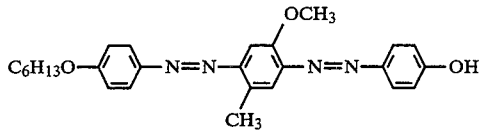

FLC Materials

An FLC material suitable for the multilayer guest-host filter is CS-2004 (Chisso Corp., 2 Kamariyacho, Kanazawa-ku, Yokohama, Japan 236), which has a tilt angle of 44°. This material, unlike most commercially available materials, does not have a non-tilted smectic A* phase, at temperatures above its smectic C* phase, but enters a nematic N* phase, followed by an isotropic phase at still higher temperatures. CS-2004 has a response time of 132 ms. The nematic to smectic C* phase sequence of this material complicates its alignment, but effective techniques employing asymmetric surface treatment or applied DC and AC electric fields are taught by Patel et al. (J. S. Patel and J. W. Goodby, "Alignment of liquid crystals which exhibit cholesteric to smectic C* phase transitions", J. Appl. Phys. 59, 2355 (1986)).

4.1.2 Pleochroic Polarizer Filter

In the second case we describe a means of generating color in a pleochroic polarizer color-selective filter which employs two SSFLC devices and three pleochroic polarizers to generate color, and a third SSFLC device and linear polarizer to ensure that all the output colors are polarized in the same plane. The linear polarizer also serves to greatly increase the color purity at the output. The filter can be divided into three stages followed by a linear polarizer. Each stage consists of a primary-color pleochroic polarizer followed by a 45° switching angle SSFLC device. The three pleochroic polarizers employed are: blue-green, blue-red, and green-red, where for instance blue-green means that blue and green are polarized along the same axis, and red light is unpolarized.

Figure 2:
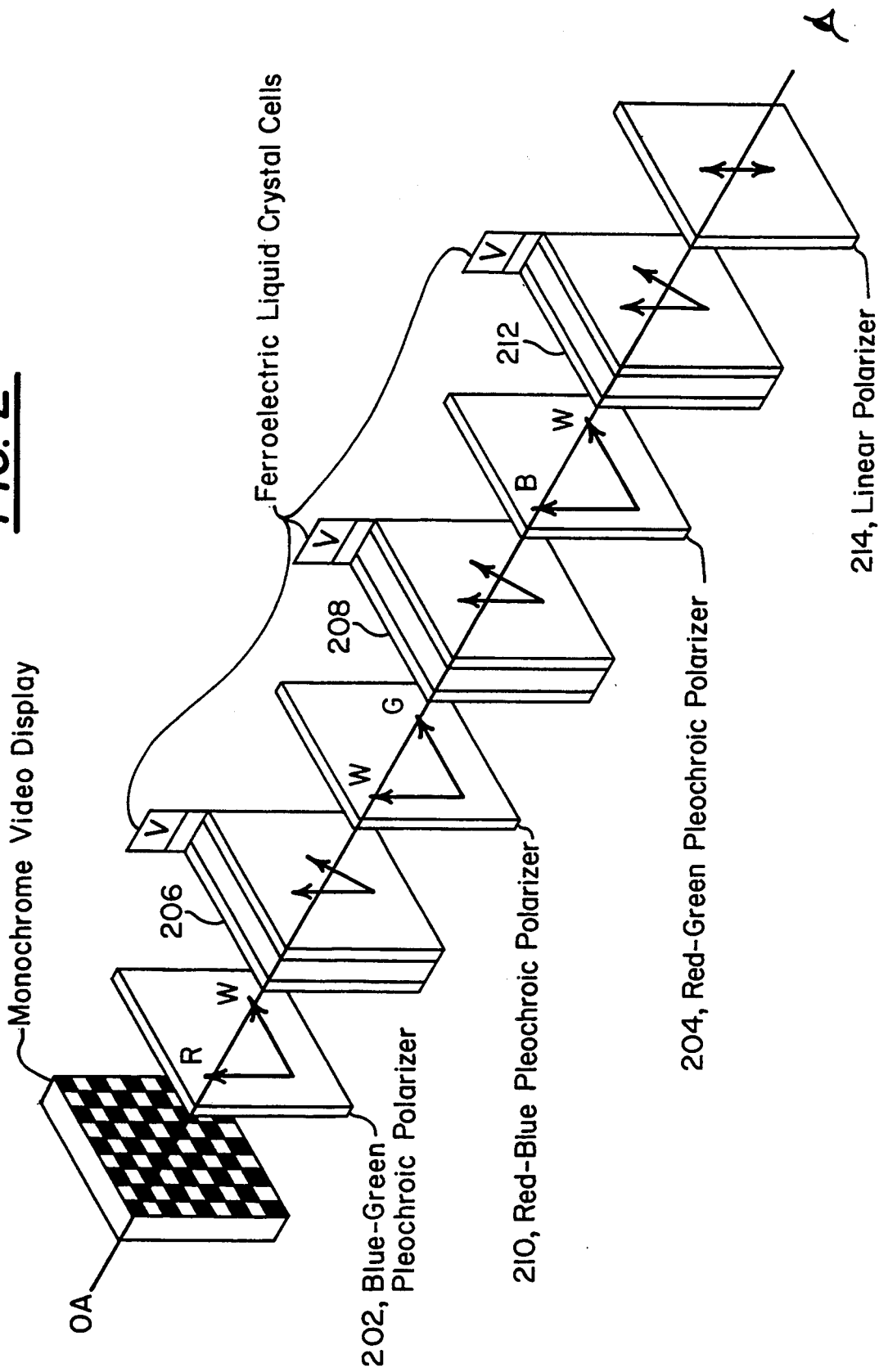
FIG. 2 shows the structure of the three-SSFLC pleochroic polarizer color-selective filter.

The structure of the filter is shown in FIG. 2. The color generating part of the filter consists of a blue-green pleochroic polarizer and red-green pleochroic polarizer with two SSFLC cells 206, 208 in between, the first SSFLC cell 206 adjacent the blue-green polarizer and the second SSFLC device 208 adjacent the red-green polarizer, with a third blue-red pleochroic polarizer 210 between the first and second cells 206 and 208. The axes of the end pleochroic polarizers 202 and 204 are oriented parallel to a reference vertical, while the middle one 210 has its axis in the orthogonal direction. The SSFLC devices are oriented with one of their optic axis directions parallel to the reference vertical, with the switching sense to the other optic axis direction .being arbitrary. When both SSFLC cells are in the vertical state, the filter transmits green light which is vertically polarized. When the first SSFLC cell is switched to the its other optic axis state, the filter transmits blue light, which is horizontally polarized. When the first SSFLC cell 206 is vertical while the second cell 208 is switched to its other optic axis state, the filter transmits red light, which is vertically polarized. When both SSFLC cells are switched to their non-vertical state, the filter transmits vertically polarized light of substantially all colors.

An optional third SSFLC device 212, oriented in the same way as the first two, can be placed adjacent to the red-green pleochroic polarizer 201, followed by a color-neutral linear polarizer 214 with its axis again oriented parallel to the reference vertical. This third SSFLC cell is left vertical for the green and red filter states, but is switched to its other state for the blue-transmitting filter state. Adding the third SSFLC cell enables the filter to have all of its primary color states have the same output polarization, which is advantageous when, for example, it is used in conjunction with an liquid crystal display which is polarization sensitive. The neutral polarizer also improves the overall color saturation of the filter with most practical implementation of colored polarizers. It is obvious that the positions within the filter of each pleochroic polarizer can be rearranged, with correspondingly different switching combinations for each primary color, without departing from the scope of the invention.

In an ideal filter of this type the SSFLC devices should act as perfect half wave-plates for all visible wavelengths. However, in reality since their optical thickness varies with wavelength, the SSFLC devices are fabricated to be zeroth-order half wave-plates at a wavelength of about 550 nm. This choice of zeroth-order half-wave thickness allows for the absolute minimum variation in optical thickness for visible wavelengths on either side of the 550 nm mark, so that a significant portion of any of the primary color light will be available for transmission through the filter. Alternatively the SSFLC devices can be made thick enough so that the variation in optical thickness between wavelengths is large enough for the device to be a multiple-order half-wave plate for a blue, a green, and a red wavelength, with full-wave thickness in between these wavelengths. In the former case the SSFLC device thickness is about 2 um, in the latter case it is about 17 um.

Figure 3:
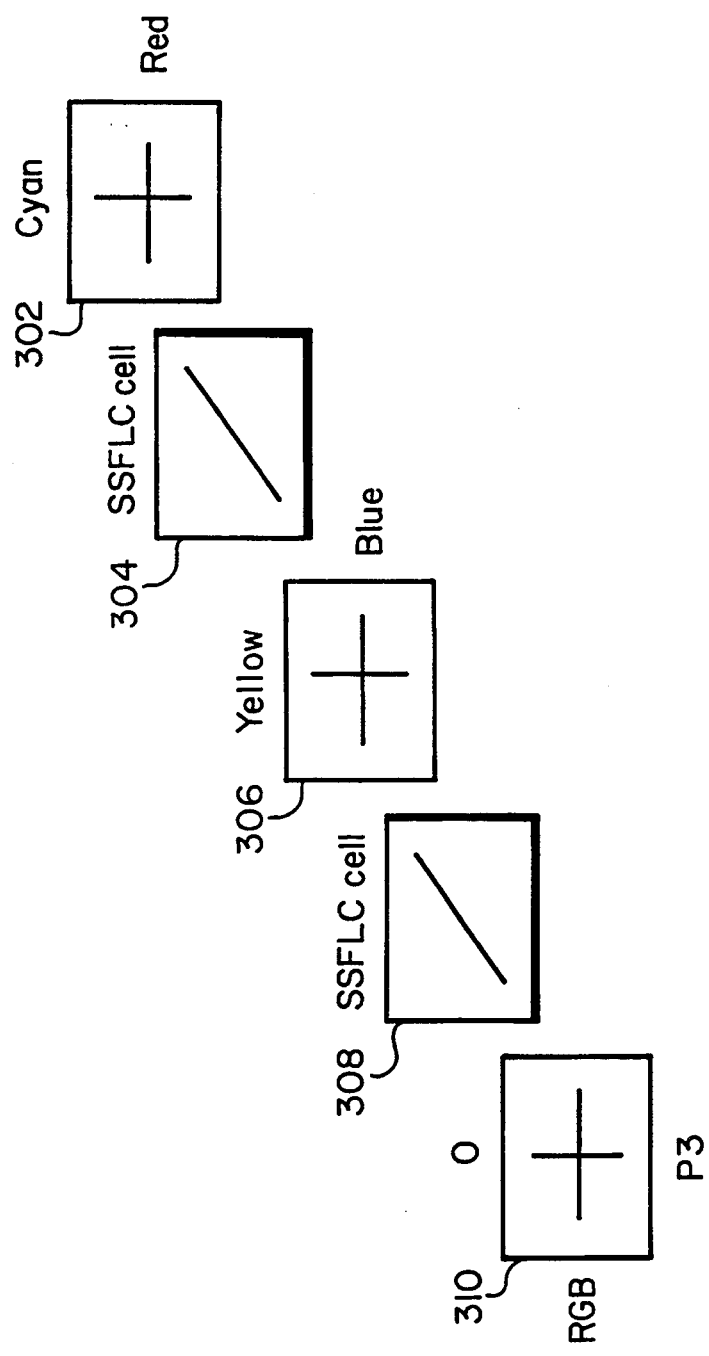
FIG. 3 shows the structure of the two-SSFLC pleochroic polarizer color-selective filter.

An alternate filter arrangement which requires only two SSFLC cells is shown in FIG. 3. The first polarizer 302 passes vertically polarized blue and green light, and horizontally polarized red light. This polarizer could be made by combining a vertically oriented blue-green polarizer with a horizontally oriented red polarizer. It is followed by an SSFLC cell 304, which is turn followed by the second polarizer 306, which passes vertically polarized green and red light, and horizontally polarized blue light. The second polarizer 306 is followed by a second SSFLC device 308, which is in turn followed by the third and last polarizer 310, which is an ordinary neutral polarizer which passes vertically polarized light of all colors. When both SSFLC devices 304, 308 have their optic axes vertical, the filter transmits green light. Switching the optic axis of the first SSFLC device 304 by 45° causes the filter to transmit red. With the optic axes of both the first and the second SSFLC cells 304, 308 switched by 45°, the filter transmits blue.

Pleochroic Polarizers

Pleochroic polarizers of the type described, are available commercially, e.g. from Polaroid Corp. in Cambridge, Mass., or from Nitto Electric Industrial Co. of Osaka Japan. They can also be fabricated from a passive ZTN cell which is doped with the appropriate pleochroic dye. In such a cell, the liquid crystal molecules are parallel to the glass plates and are oriented along an alignment direction. The pleochroic dye molecules also align themselves in this direction and light polarized perpendicular to the optic axis direction is selectively absorbed.

FLC Materials

An FLC material which aligns well, and has a tilt angle close to 22.5°, is required for the pleochroic polarizer color-selective filter. Many such FLC materials are known in the art for example the materials CS-1014 and CS-1024 from Chisso Petrochemical Corp., which have approximate room temperature tilt angles of 22°, and 25° respectively; or the material ZLI-3654 from Merck, which has a tilt angle of 25°. Materials such as these have a nematic and smectic A* phase which is generally regarded to facilitate the alignment of the FLC.

Color-selective Interference Filters

We now describe a means of generating color using a plurality of SSFLC devices, birefringent elements, and linear polarizers, using the principle of selective interference. The basis of the invention lies in the ability to modulate the optical thickness of a birefringent element as seen by light polarized linearly at 45° to its optic axis. This is achieved by employing the ability of the SSFLC devices to operate as programmable waveplates. Switching between the three primary colors necessitates employing a specific ratio of thicknesses between each optically retarding element used in the filter. The core of a given filter may be divided into stages, each stage being a sequence of optical elements placed between parallel polarizers. Both 1-stage, and 2-stage filters have been demonstrated. A special case of the 1-stage filter employs just two SSFLC devices and no birefringent element.

Figure 4A:
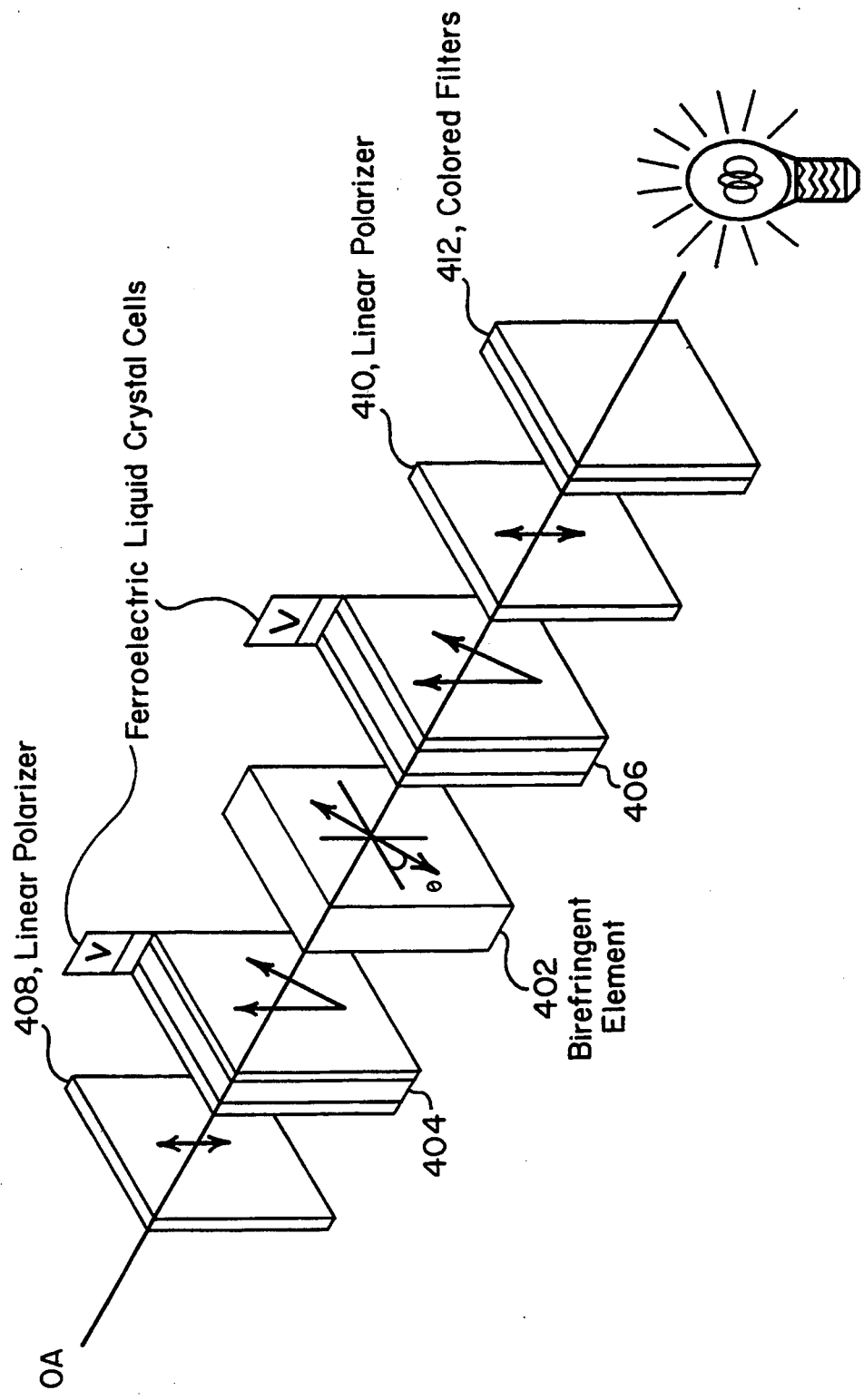
FIG. 4(a) shows a 1-stage filter.
Figure 4B:
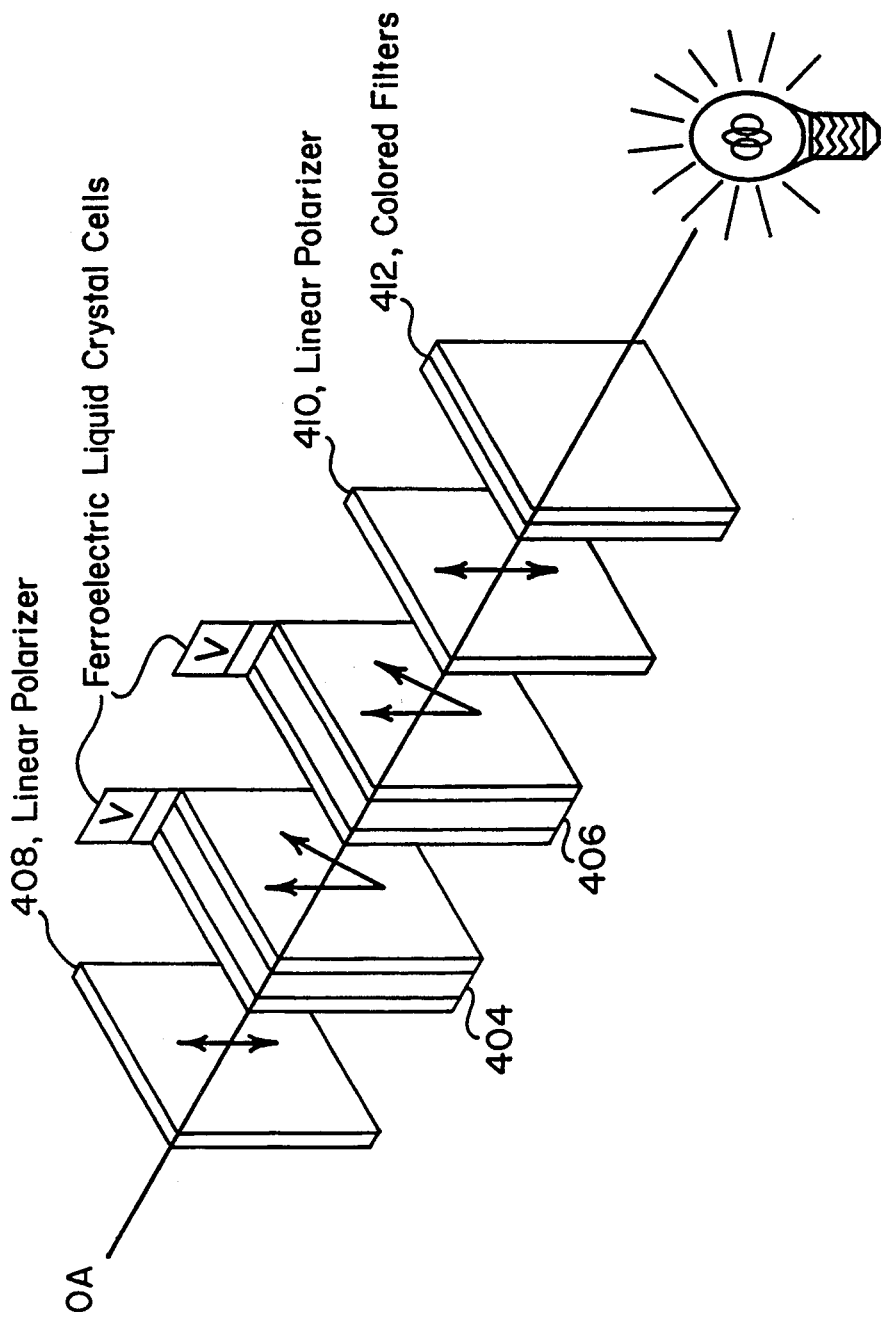
FIG. 4(b) shows a 1-stage filter without a birefringent element.
Figure 4C:
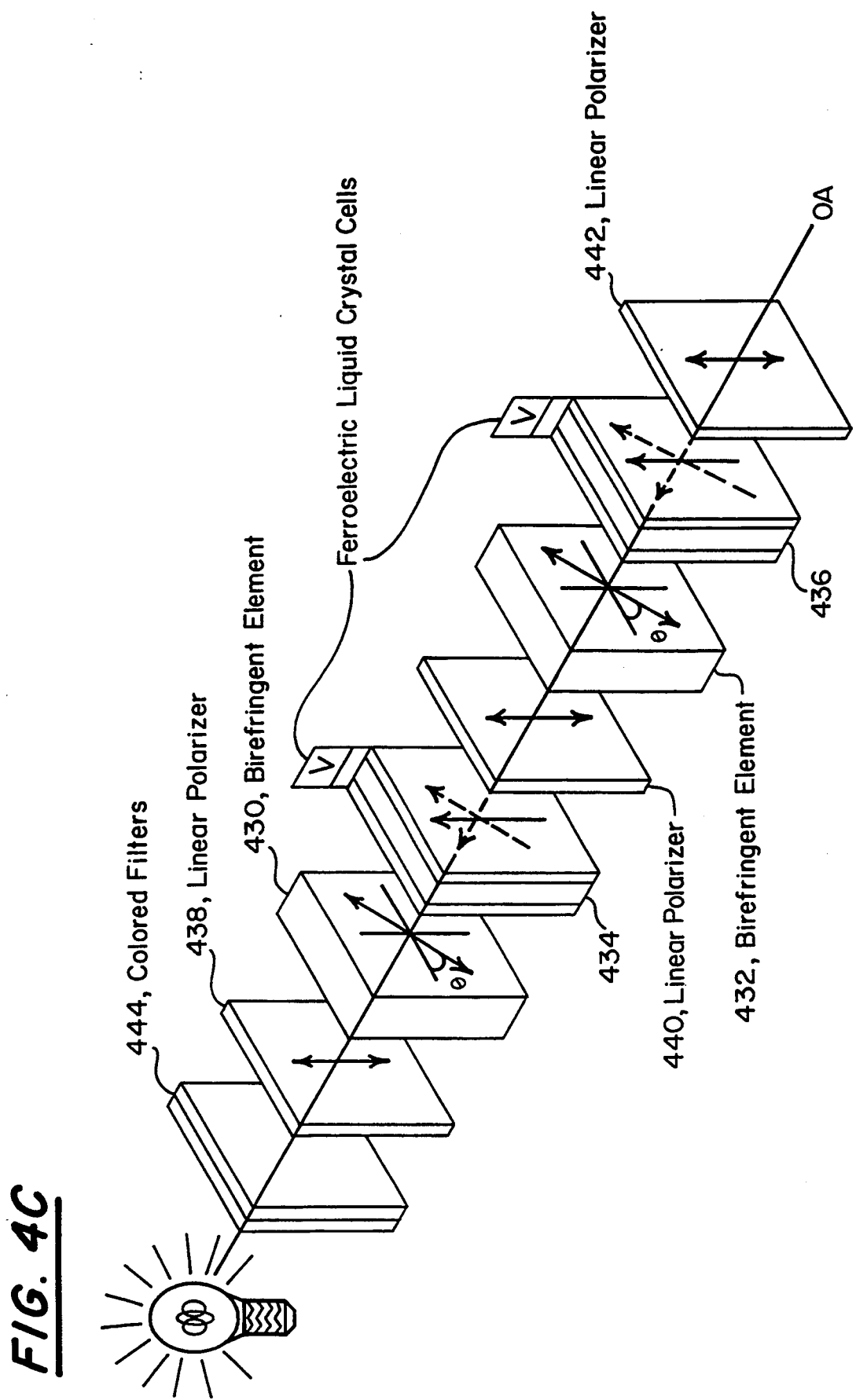
FIG. 4(c) shows a 2-stage filter.

We describe our color-selective interference filters with reference to the drawings. FIGS. 4A–4C show the basic structure of (a) a 1-stage filter; (b) a 1-stage filter with no birefringent element; and (c) a 2-stage filter, respectively.

A 1-stage filter is shown in FIG. 4A, and consists of a birefringent element 402, two SSFLC devices 404, 406, two linear polarizers 408, 410, an optional set of one or more colored filters 412, an optional diffuser element (not shown), and a reflective surface (not shown). The birefringent element 402 is situated between the two SSFLC devices 404, 406, and all three elements together are situated between parallel polarizers 408, 410. The polarizers have their axes oriented parallel to a reference vertical and the optic axis of the birefringent element 402 is oriented at 45° to this direction. The SSFLC devices 406, 408 contain a 45° switching angle FLC and are oriented so that their optic axes may be switched parallel to the optic axis of the birefringent element, or parallel to the polarizer axes.

A special case of the 1-stage filter shown in FIG. 4B is constructed exactly as described except for the absence of a birefringent element.

To produce good color saturation requires the filter to have pass bands centered in the red, green, and blue parts of the spectrum. Particularly with the one-stage filters, this may be achievable only at the expense of one or more of the filter states having significant transmission well out of the pass band, i.e. in the shortest wavelength or violet regions of the visible spectrum. Furthermore, the pass bands may not be narrow enough to produce good color saturation, even in the absence of violet light. Both these situations may be remedied by restricting the range of wavelengths present at the filter input. For example, the shortest wavelengths of "white" light are not necessary for the production of good red-green-blue primary colors, and may be removed to relax the requirements on the transmission ranges of the filter states. Specifically, one-stage color-selective filters can be constructed with improved properties if the spectral transmittance of the red state is permitted to also transmit slightly in the violet. If violet wavelengths were present, the saturation of the red state would be degraded, but they may be removed without harmful consequence, even to the blue state. If the input light contains the objectionable wavelengths, this removal may be effected by a passive filter that always blocks transmission of violet light. Such a filter 412 can be placed anywhere in the path of the selective-color filter system, including at the input, before the linear polarizer 410, as shown in the FIG. 4A. Alternately, in some circumstances it may be possible to control the spectrum of the light from the beginning. For example, if the source is a CRT video display, then the phosphors employed can be chosen to emit minimally in the violet. If the filter states have spectral transmittances that are slightly too broad to give the best color saturation, the filter performance can also be improved by passive filters that block narrow ranges of wavelengths between the primary colors. Alternately, this improvement can also be effected by using a light source that emits most strongly only in narrow wavelength bands centered in the primary color regions. With a CRT this could be accomplished by choosing phosphors that had relatively narrow emission spectra in the red, green, and blue.

The 2-stage filter is shown in FIG. 4C, and consists of two birefringent elements 430, 432, two SSFLC devices 434, 436, three linear polarizers 438, 440, 442, an optional diffuser element (not shown), and for certain embodiments, a colored filter system 444 as described in reference to the 1-stage filters, and/or a reflecting surface. In each stage of a 2-stage filter, the birefringent element is placed adjacent to an SSFLC device (the order being unimportant) with both elements together being situated between a first and second polarizer, whereby the second polarizer of the first stage serves also as the first polarizer for the second stage. The polarizers have their axes oriented parallel to a reference vertical and the optic axis of each birefringent element is oriented at 45° to this direction. For operation in the reflective mode, a reflective surface is placed at one end of the 2-stage filter adjacent to the polarizer. The opposite end then becomes the input and output to the filter and a diffuser element may be situated at this end. Each SSFLC device contains a 45° switching angle FLC and is oriented in either of two ways: the first way allows the optic axis of the device, to be switched between the polarizer axis direction, and a direction parallel to the optic axis of the birefringent element; the second way allows the same optic axis to be switched between the polarizer axis direction, and a direction perpendicular to the optic axis of the birefringent element. One of these two geometries is employed in obtaining the three primary colors depending upon the 2-stage filter being used. The 2-stage filter embodiments can be operated in either the reflective or the transmissive mode, although the color saturation in the reflective mode is always greater despite greater light loss. Again, some of the embodiments employ one or more colored glass filters to improve the color saturation while others do not.

It is known in the art how to improve the off-axis viewing of a Lyot filter (Pochi Yeh, Optical Waves in Layered Media, (Wiley, New York, 1988), pp. 270–276.) by splitting each birefringent element in half, rotating the second half through 90° with respect to the first, and separating the two halves by an achromatic half wave-plate with optic axis parallel to the polarizer axes. This method can equally well be applied to the color-selective filters described herein. Hence the birefringent elements and the SSFLC devices can be split into "combined wide field elements" and juxtaposed in such a way as to give maximum off-axis viewing for each stage of the filter.

Birefringent Elements

Birefringent elements of the type used can be made from many optically anisotropic materials, such as uniaxial quartz or calcite crystals, or from laminated polymer layers cemented between glass plates. The latter type were employed in demonstrating the color-selective interference filters. For display applications, the birefringent elements do not require optically flat surfaces. The various kinds of birefringent materials available along with their properties are well known in the art. We refer the reader to any standard optics company for information.

Colored Filters

Long-pass color glass filters which absorb visible wavelengths in the violet, are commercially available from such companies as Schott Glass Technologies, Inc. These filters are well known In the art. Optical notch filters which absorb over a narrow frequency band can be made with dielectric layers or using cholesteric liquid crystals (S. Ishihara, F. Yokotani, Y. Matsuo, and K. Morimoto, "Preparation and properties of optical notch filters of cholesteric liquid crystals," Polymer 29, 2142 (1988)).

FLC Materials

An FLC material which aligns well, and has a tilt angle close to 22.5° is required for the color-selective interference filters. Such materials have been mentioned above in reference to the pleochroic polarizer color-selective filter. The material employed in demonstrating the color-selective interference filters was CS-1014, however ZLI-3654, which has similar birefringence and refractive index vs. wavelength dispersion, could equally well be used without significantly changing the ratios of optical element thicknesses. Other liquid crystals with different birefringences could also be used. The thickness of liquid crystal elements should increased or decreased in proportion to the increase or decrease of the liquid crystal's birefringence in comparison to the exemplary liquid crystal CS-1014. Slight adjustments might have to be made to the birefringent element thicknesses if the refractive index dispersion of the chosen liquid crystal differed significantly from the exemplary CS-1014.

We now describe the combinations of birefringent elements of specific optical thickness, and SSFLC devices with specific liquid crystal layer thickness used to produce filters capable of switching between the three primary colors of red green and blue. The values given are optimal, however, the optical thickness of the birefringent elements can usually vary by about ±2%, while the thickness of the liquid crystal layers can vary anywhere from about ±5% to ±20%, without significantly altering the saturation in a given color state.

Exemplary One-stage Filters

FIGS. 4(a) and 4(b) show the layout of a 1-stage selective interference filter. Such a filter requires a specific ratio of optical element thicknesses to reflect the three primary colors of red green and blue.

Filter no. 1 employs no birefringent elements, a first SSFLC device with a liquid crystal layer of physical thickness 4950 nm, and a second SSFLC device with a liquid crystal layer of physical thickness 2650 nm. A colored filter which absorbs violet light is employed in the filter arrangement. We adopt the notation that the first and second SSFLC devices will be referred to as SD1 and respectively, and that SD1(45) means the first such device has its optic axis switched at 45° to the polarizer axis and parallel to the optic axis of the birefringent element. Then the switching combinations corresponding to the three primary color states are: red: SD1 (45) , SD2 (0); green: SD1 (45), SD2(45); blue: SD1(0), SD2(45).

Filter no. 2 employs a birefringent element of 750 nm optical thickness (retardance), a first SSFLC device with a liquid crystal layer of 1000 nm physical thickness, and a second SSFLC device with a liquid crystal layer of 1830 nm physical thickness. A colored filter which absorbs violet light is employed in the filter arrangement. The switching combinations corresponding to the three primary color states are: red: SD1(0), SD2(0); green: SD1(0), SD2(48); blue: SD1(45), SD2(0).

Filter no. 3 employs a birefringent element of optical thickness range 600 nm, a first SSFLC device with a liquid crystal layer of physical thickness 1000 nm, and a second SSFLC device with a liquid crystal layer of physical thickness 1800 nm. A colored filter which absorbs violet light is employed in the filter arrangement. The switching combinations corresponding to the three primary color states are: red: SD1(45), SD2(0); green: SD1(45), SD2(45); blue: SD1(0), SD2(45).

4.2.2 Exemplary Two-stage Filters

FIG. 4(c) shows the layout of a 2-stage selective interference filter. Such a filter again requires a specific ratio of optical element thicknesses to transmit or reflect the three primary colors of red green and blue.

Filter no. 1 employs a first birefringent element of optical thickness 690 nm, a first SSFLC device with a liquid crystal layer of physical thickness 2000 nm, a second birefringent element of optical thickness 1380 nm, and a second SSFLC device with a liquid crystal layer of physical thickness range 1500 nm. No colored filter is employed. The terms "first" and "second" here refer to two separate filter stages where the first and second stages are separated by an intervening polarizer. The switching combinations corresponding to the three primary color states are: red: SD1(0), SD2(0); green: SD1(45), SD2(45); blue: SD1(45), SD2(0).

Filter no. 2 employs a first birefringent element of optical thickness 975 nm, a first SSFLC device with a liquid crystal layer of physical thickness 2000 nm, a second birefringent element of optical thickness 1380 nm, and a second SSFLC device with a liquid crystal layer of physical thickness 4500 nm. A colored filter which absorbs violet light is employed in the filter arrangement. The switching combinations corresponding to the three primary color states are: red: SD1(45), SD2(45); green: SD1(0), SD2(45), blue: SD1(0), SD2(O).

Filter no. 3 employs a first birefringent element of optical thickness 1850 nm, a first SSFLC device with a liquid crystal layer of physical thickness 1500 nm, a second birefringent element of optical thickness 965 nm, and a second SSFLC device with a liquid crystal layer of physical thickness 2400 nm. A colored filter which absorbs violet light is employed in the filter arrangement. The switching combinations corresponding to the three primary color states are: red: SD1(45), SD2(45); green: SD1(45), SD2(0), blue: SD1(0), SD2(0).

Filter no. 4 employs a first birefringent element of optical thickness 690 nm, a first SSFLC device with a liquid crystal layer of physical thickness 1900 nm, a second birefringent element of optical thickness 1380 rim, and a second SSFLC device with a liquid crystal layer of physical thickness 4600 nm. A colored filter which absorbs violet light is employed in the filter arrangement. The switching combinations corresponding to the three primary color states are: red: SD1(0), SD2(45), or, SD1(0), SD2(0); green: SD1(45), SD2(45), blue: SD1(45), SD2(0).

Filter no. 5 employs a first birefringent element of optical thickness 690 nm, a first SSFLC device with a liquid crystal layer of physical thickness 1800 nm, a second birefringent element of physical thickness 1380 nm, and a second SSFLC device with a liquid crystal layer of physical thickness 1700 nm. No colored filter is employed. The switching combinations corresponding to the three primary color states are: red: SD1(0), SD2(0); green: SD1(45), SD2(-45), blue: SD1(45), SD2(0).

Filter no. 6 employs a first birefringent element of optical thickness 975 nm, a first SSFLC device with a liquid crystal layer of physical thickness 1800 nm, a second birefringent element of physical thickness 1380 nm, and a second SSFLC device with a liquid crystal layer of physical thickness 4500 nm. A colored filter which absorbs violet light is employed in the filter arrangement. The switching combinations corresponding to the three primary color states are: red: SD1(-45), SD2(45), or, SD1(-45), SD2(0); green: SD1(0), SD2(45), blue: SD1(0), SD2(0).

Filter no. 7 employs a first birefringent element of optical thickness 900 nm, a first SSFLC device with a liquid crystal layer of physical thickness 1200 nm, a second birefringent element of physical thickness 1350 nm, and a second SSFLC device with a liquid crystal layer of physical thickness 5200 nm. A colored filter which absorbs violet light is employed in the filter arrangement. The switching combinations corresponding to the three primary color states are: red: SD1(-45), SD2(0); green: SD1(0), SD2(45), blue: SD1(0), SD2(0).

Filter no. 8 employs a first birefringent element of optical thickness 1890 nm, a first SSFLC device with a liquid crystal layer of physical thickness 1800 nm, a second birefringent element of optical thickness 960 nm, and a second SSFLC device with a liquid crystal layer of physical thickness 2000 nm. No colored filter is employed. The switching combinations corresponding to the three primary color states are: red: SD1(0), SD2(-45); green: SD1(-45), SD2(0), blue: SD1(0), SD2(0).

4.3 SSFLC Devices

Figure 5:
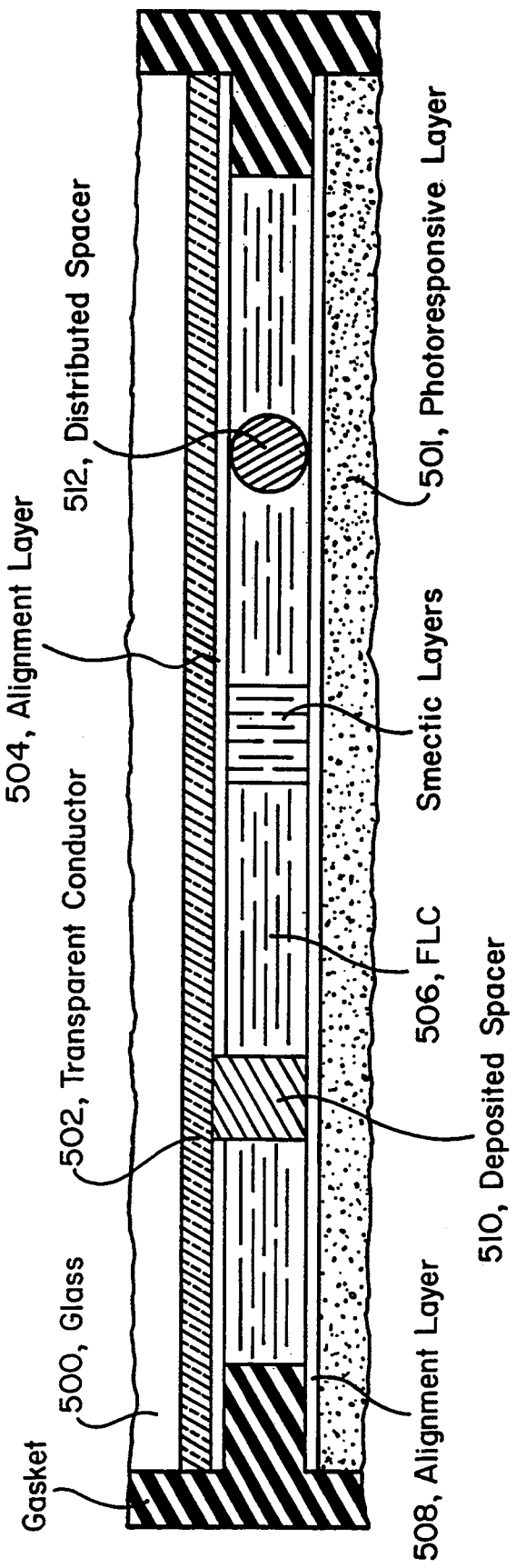
FIG. 5 shows the generalized structure of an SSFLC device, showing transparent substrates, transparent electrodes, alignment layers, various spacing techniques, and FLC.

Sections 4.1 and 4.2 above describe various ways in which SSFLC devices can be used to perform switchable color-selective filtering in accordance with the present invention. This section describes way of building and operating the necessary SSFLC devices. FIG. 5 shows the generalized structure of an SSFLC device. It consists of a pair of glass substrates 500, 501, spaced at a desired thickness in the range of a few microns, each coated on the inside with a transparent ITO electrode 402 and alignment layers 504, 508, respectively, and the intervening space filled with a suitable FLC material 506 and held apart by spacers 510, 512. The alignment layers are buffed along a given direction prior to assembling the cell, and the cell is assembled with the buffing direction on each surface oriented parallel or anti-parallel.

In the SSFLC device the FLC forms the dielectric in a thin transparent capacitor with smectic layers oriented approximately perpendicular to the surfaces of the glass plates. These materials are ferroelectric, with a spontaneous polarization P, perpendicular to both the layer normal and the average molecular long axis. The switching time of these materials is greatly influenced by P with commercially available materials having a value of P anywhere between 0 and 300 $nC/cm^2$. The torques produced by applied electric fields on the spontaneous polarization P reorient the anisotropy axis of the FLC, and hence change the refractive indices, which is the method of optical modulation used in preferred embodiments of the present invention. In the absence of an applied field the rod-shaped molecules helix about the smectic layering direction. U.S. Pat. Nos. 4,367,924 and 4,563,059 teach that this helical structure can be permanently unwound by making the FLC film thin enough. In this geometry the device has two voltage-selected states with their optic axes approximately in the plane of the plates and separated by the helix cone angle $\psi$ (where $\psi$ is the tilt angle of the molecules from the layer normal). Such a thin film layer is termed as being in the surface stabilized geometry and it is these SSFLC devices which are employed in the preferred embodiments of the present invention.

Transparent Electrodes

The required transparent electrodes may be deposited on the substrate plates by a variety of methods known in the art. For example, they may be made of tin oxide or of indium-tin oxide deposited by vacuum evaporation, sputtering, or spray pyrolysis. They may also be made of a metal, deposited by vacuum evaporation or sputtering, provided the metal is deposited in a layer thin enough to allow significant optical transmission.

Spacing

Being partly fluid in nature, the FLC will fill the gap allotted to it between the glass substrates. Since the FLC film's optical and electrical properties depend strongly on its thickness, maintaining a gap of a uniform and desired thickness is essential to the operation of the devices of the present invention. The gap between the confining surfaces can be defined by placing a spacing gasket 510 of the desired thickness around the edge of the gap and/or distributing spacers 512 throughout the gap. The spacing gasket 510 may also be formed of a sealing material and used to prevent the entrance of unwanted materials into the gap after it is filled with the FLC. The distributed spacers 512 can be formed by a number of techniques. For example, they could be formed by evaporating a patterned layer of oxide (e.g. SiO, $SiO_2$, etc.) or by spinning and patterning a layer of a polymer such as polyimide onto one of the confining surfaces. Alternately, the spacers may be comprised of particles such as glass .fibers or polymer spheres of the desired size which are deposited onto the surfaces from a liquid or gas suspension. Once the gap is formed, the FLC material may be introduced into it from its edge by relying on capillary forces. This filling technique is aided by heating the FLC to its isotropic liquid phase and by evacuating the air from the gap prior to filling.

Alignment

To fabricate an SSFLC device with a uniform smectic layering direction and thus a uniquely defined optic axis direction, an alignment layer of some sort must be deposited. This alignment may be achieved by a variety of different methods. The most practical methods rely on the application of an anisotropic coating to the FLC-confining surfaces, as shown in FIG. 5. Many of the similar prior-art coatings used for aligning nematic liquid crystals, as reviewed by Jaques Cognard in Alignment of Nematic Liquid Crystals and Their Mixtures, (Gordon and Breach, New York, 1982), can also be used for FLCs, in particular, rubbed polymer layers and obliquely evaporated oxides.

Electrical Driving

As is well known in the art, the SSFLC device is switched into one state by one sign of applied voltage, and into the other state by the opposite sign of applied voltage. It is also well known in the art that lifetimes of liquid crystal devices can be degraded by electrical drive waveforms that contain a significant DC component. The filters described herein in general require their component FLC cells to be in one state for a third of the time, and in the other state for two thirds of the time. It is simple to ensure DC balance under these conditions merely by requiring that average voltage applied to the cell during the one third of the time be twice in magnitude and opposite in sign to the average voltage applied during the other two thirds of the time. This might be achieved, for example, by driving the FLC device in question with $-6$ V for one third of the time and $+3$ V for two thirds of the time. Of course, the applied voltage need not be constant during the time interval where the FLC device is in the given state; rather only it must keep the same sign, and the averages over the intervals should have the aforementioned 2:1 ratio.

Reflector

The reflecting surface for operating the devices of the present invention in the reflective mode, may be made from dielectric materials or from a metal. The surface must be highly reflective across the visible spectrum. Such reflectors are well known in the art.

Video Systems

The selective-color filters described above may be combined in various ways with video cameras or video displays to make full-color video systems. These systems have the advantage that full-color operation can be attained with cameras or displays that are only black and white. By black and white we generally mean a device that also utilizes many grey shades between black and white. A useful black and white display might be, for instance, a single-electron-beam CRT with a phosphor or phosphor combination that emits "white" light. It might also be a liquid crystal video display incorporating ferroelectric liquid crystals (FLCs) addressed by an active matrix for fast switching, such as disclosed by Hartmann, (W. J. A. M. Hartmann, "Ferroelectric liquid crystal video display," IEEE Electron Devices, 36, 1895 (1989)), or by Cotter et al. (L. K. Cotter, T. J. Drabik, R. J. Dillon, and M. A. Handschy, "Ferroelectric-liquid-crystal/silicon-integrated-circuit spatial light modulator," Opt. Lett. 15, 291 (1990)).

Where conventional full-color video systems require pixels composed of red, green, and blue subpixels, the systems of the prior art have simpler black and white pixels. Thus, the need for three-beam CRTs with shadow masks and RGB phosphor triads is removed, as is the need for RGB color dots in video cameras and liquid crystal displays. The systems of the present invention can still present or sense as many different color shades as the more conventional systems, as almost any given color can be composed of a mixture of the primaries as appropriate different intensities. In the present systems the different intensities appropriate to each primary color are presented or sensed sequentially rather than simultaneously but at different locations as in conventional systems. In order for full-color moving pictures to have a pleasing appearance, the three color states must be sequenced through in a time shorter than or equal to the human visual fusion time. Thus, where the conventional video systems require 30 full-color frames per second, the black and white video devices of the present invention's systems will have to be operated at 90 frames per second, since one frame of each of red, green, and blue will be required for every full-color frame of the conventional system. The filters described herein and the video displays mentioned above are all capable of meeting this frame-rate requirement, and many capable video camera sensors such as charge-coupled devices (CCDs) are known in the art.

Figure 6A:
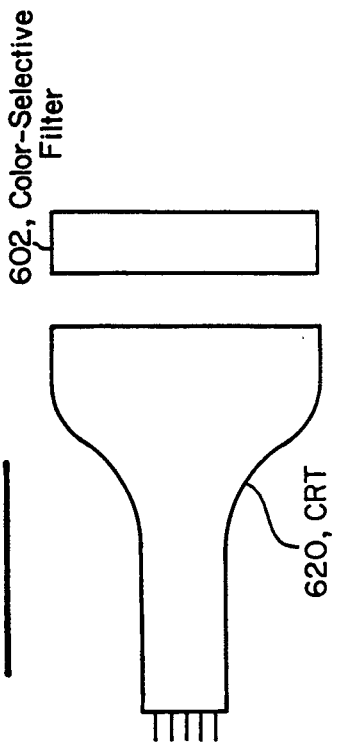
FIG. 6(a)–6(d) show frame-sequential color video systems.

FIG. 6(a) shows a full-color video camera system of the present invention comprising a black and white video camera 600 and any of the color-selective filters 602 described above. The video camera is formed of a camera sensor 604 and lens 606. The sensor 604 need not have equal sensitivity to all wavelengths, as varying sensitivity can be compensated for electronically. However, it must have useful sensitivity in all three primary color bands if full-color images of good fidelity are to be recorded.

Figure 6B:
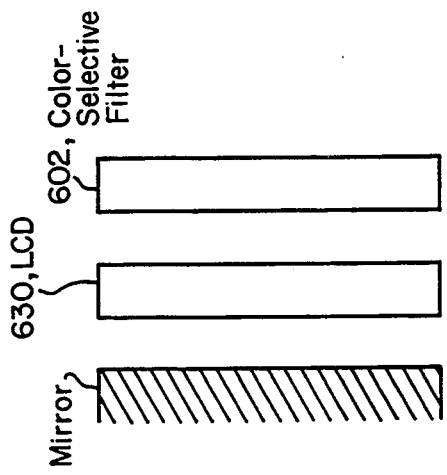
Figure 6C:
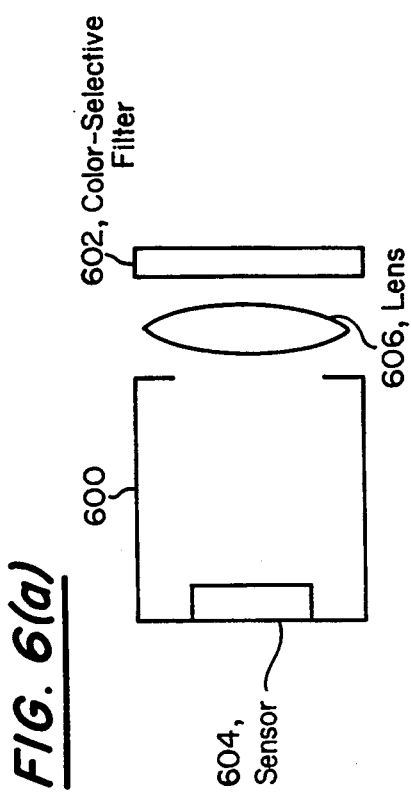
Figure 6D:
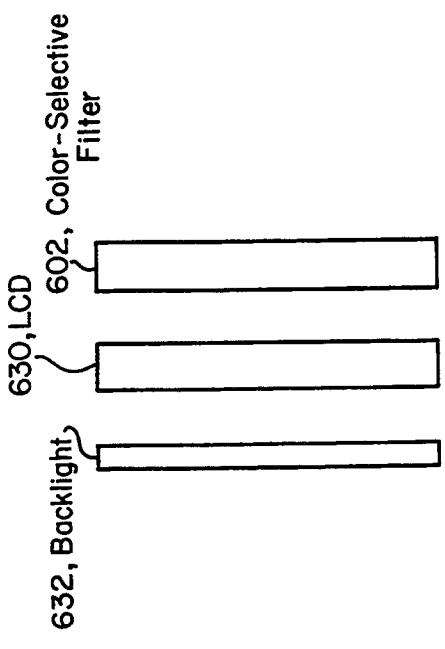

The display systems of the present invention may be configured as either transmissive or reflective systems, as shown in FIGS. 6(a)–6(d). The CRT 620 could only be used for backlit transmissive displays, as shown in FIG. 6(b). A transmissive liquid crystal video display could also be similarly used, as shown in FIG. 6(c), where liquid crystal 630 is placed between a uniform, white backlight and any of the color filters. FIG. 6(d) shows a reflective video display system of the present invention, where a liquid crystal display 630 is placed between any of the color filters 602 described above and a reflector 640. Then, the display may be viewed in ambient light. This system may be particularly advantageous in environments of bright ambient light, where the emissive displays have difficulty providing enough light to be seen clearly.

All the described systems require electronic driving means capable of switching the filter through its primary color states in sequence synchronously with the recording or display of the images appropriate to each color. Techniques for the design and construction of such electronics are well known in the art. When the black and white video image is addressed in a raster fashion, and the camera or display has a response time which is not quite fast enough to accomplish the recording or display of a complete frame in the desired time, it may help to segment the color filter, as disclosed by Haven. (Thomas J. Haven, cit.)

What we claim is:

1. A frame-sequential color video system comprising:
   a monochrome video means for producing a monochrome, single colored but multi-wavelength, video signal; and
   a ferroelectric liquid crystal color-selective filter means adjacent and optically in series with said monochrome video means, for selectively interfering with light of predetermined wavelengths which represent predetermined colors, to pass only predetermined colors of said monochrome video signal, based on a driving signal.

2. A system as in claim 1 wherein said ferroelectric liquid crystal color-selective filter means includes a plurality of ferroelectric liquid crystal cell elements and driving means for producing said driving signal for switching said elements such that said predetermined colors are three primary colors which are produced at three switching configurations and times; said monochrome video means provides an intensity modulating signal, wherein an arbitrary color may be generated by combining frames of each said primary color, at faster than 10 ms per frame.

3. A system as in claim 2 wherein said driving means drives said plurality of ferroelectric liquid crystal cell elements at different timings synchronized with said intensity modulating signal.

4. A system as in claim 1, wherein said ferroelectric liquid crystal color-selective filter means includes multiple filter elements, and each filter element includes means for selectively changing a polarization of light, said change varying selectively as a function of wavelength.

5. A frame-sequential color video system comprising:
   monochrome video means for producing a monochrome video single colored but multi-wavelength, signal; and
   ferroelectric liquid crystal color-selective filter means adjacent said monochrome video signal means for selectively interfering with only predetermined wavelengths which represent predetermined colors of said monochrome video signal based on a driving signal which passes through a sequence of states, each said state persisting for a predetermined length of time independent of a commanded color or of content of said monochrome video signal, said ferroelectric liquid crystal color-selective filter means passing wavelengths according to said states.

6. A system as in either of claims 4 or 5, further comprising at least one linear polarizer means, optically downstream of said ferroelectric crystal color-selective filter means, for passing only light having a predetermined polarization.

7. A system as in claim 6 further comprising a second linear polarizer means optically in series with said ferroelectric liquid crystal color selective filter means, and further comprising at least one birefringent element optically in series with said ferroelectric liquid crystal color selective filter means.

8. A frame-sequential color video system as in claim 5 wherein each said state persists for a constant time which is the same as every other state.

9. A color-selective filter system which sequentially produces three primary colors at different times, comprising:
   at least two linear polarizer means for polarizing light passing therethrough to a predetermined polarization;
   ferroelectric liquid crystal color;selective filter means, including exactly two, and no more, ferroelectric liquid crystal cells which are switched to interfere with different ones of said primary colors at different switching states thereof based on a driving signal, said plurality of cells being optically in series with both said linear polarizer means.

10. A system as in claim 9, wherein said ferroelectric liquid crystal color-selective filter means includes means for selectively rotating a polarization of only particular wavelengths of light corresponding to a particular color.

11. A system as in claim 9 wherein said switching of ferroelectric liquid crystal cells allows passing one primary color while blocking the other two primary colors.

12. A frame-sequential color video system comprising:
   monochrome video means for producing a monochrome, single colored but multi-wavelength, video signal;
   ferroelectric liquid crystal color selective filter means, including exactly two, and no more, ferroelectric liquid crystal color-selective elements, optically in series with said monochrome video means, for assuming three switching states each of which interferes with a predetermined wavelength which represents a predetermined color of said monochrome video signal, respectively, based on a driving signal.

13. A system as in claim 12 wherein said color-selective filter means further comprises an electrical driving means for driving said ferroelectric liquid crystal color selective elements at different timings synchronized with an intensity modulating signal produced by said monochrome video means, and at least two linear polarizer means, optically in series with said ferroelectric liquid crystal color selective filter means.

14. A system as in either of claims 1 or 12 further comprising at least two linear polarizer means, optically in series with one another, each for passing only light having a predetermined polarization.

15. A system as in claim 14 wherein said ferroelectric liquid crystal color selective filter means includes first and second ferroelectric liquid crystal color-selective elements, each of which selectively changes a polarization of light that is incident thereon, said change varying selectively as a function of wavelength, and said two linear polarizer means located with a first polarizer optically upstream of said liquid crystal color selective filter means and a second polarizer optically downstream thereof, and a birefringent element whose optical thickness is modulated by operation of the ferroelectric liquid crystal color selective element.

16. A system as in claim 15 wherein one of the ferroelectric liquid crystal color-selective elements functions as said birefringent element.

17. A system as in claim 15 wherein said birefringent element is a separate element located between the first and second polarizers.

18. A system as in claim 15 further comprising at least one colored filter means which absorbs visible light in a predetermined narrow band of frequencies to increase a color saturation of at least one of said primary colors of red, green and blue.

19. A system as in claim 18 wherein said color filter absorbs in the violet color range.

20. A system as in claim 15 wherein said birefringent element is of a given retardation and formed by: two component birefringent elements, each of a first retardation, one of which has an optical axis rotated through 90° with respect to the other, and an achromatic half wave-plate between said components with an optic axis oriented substantially at 45° to each of said optic axes of said component birefringent elements to reduce any change in observed color with increased off-axis viewing.

21. A system as in claim 15, wherein each said ferroelectric liquid crystal color-selective element is formed by:
   two component ferroelectric liquid crystal sub-elements, one of which has an optical axis rotated through 90° with respect to the other, and an achromatic half wave-plate between said components with an optic axis oriented substantially at 45° to each of said optic axis of said component ferroelectric liquid crystal sub-elements to reduce any change in observed color with increased off-axis viewing.

22. A system as in claim 15 wherein there are only two of the ferroelectric liquid crystal color-selective elements, and thicknesses of said two ferroelectric liquid crystal color-selective elements and of said birefringent element are such that for different electrical states of said liquid crystal color-selective elements, red, green and blue primary colors are produced.

23. A system as in claim 15 wherein the thicknesses of said first and second ferroelectric liquid crystal color-selective elements are substantially 1000 nm and 1830 nm respectively; wherein said birefringent element is oriented with its optic axis at 45° to said first plane of polarization;the optical thickness of said birefringent element is substantially 600 nm; the color red may be observed with the optic axis states of said first and second liquid crystal color-selective elements being parallel to said first plane of polarization; the color green may be observed with the optic axis state of said first liquid crystal color-selective element being parallel to said first plane of polarization, and the optic axis state of said second liquid crystal color-selective element being parallel to said optic axis of said birefringent element; the color blue may be observed with the optic axis state of said first liquid crystal color-selective element being parallel to said optic axis of said birefringent element, and the optic axis state of said second liquid crystal color-selective element being parallel to said first plane of polarization.

24. A system as in claim 23 further comprising a color filter which absorbs in the violet color range.

25. A system as in claim 15 wherein the thicknesses of said first and second ferroelectric liquid crystal color-selective elements are substantially 1000 nm and 1830 nm respectively; wherein said birefringent element is oriented with its optic axis at 45° to said first plane of polarization;the optical thickness of said birefringent element is substantially 750 nm; the color red may be observed with the optic axis states of said first and second liquid crystal color-selective elements being parallel to said first plane of polarization; the color green may be observed with the optic axis state of said first liquid crystal color-selective element being parallel to said first plane of polarization, and the optic axis state of said second liquid crystal color-selective element being parallel to said optic axis of said birefringent element; the color blue may be observed with the optic axis state of said first liquid crystal color-selective element being parallel to said optic axis of said birefringent element, and the optic axis state of said second liquid crystal color-selective element being parallel to said first plane of polarization.

26. A system as in claim 25 further comprising a color filter which absorbs in the violet color range.

27. A system as in claim 14, wherein said linear polarizer means comprises three optical polarizers which are optically in series, and said liquid crystal color-selective filter means includes first and second ferroelectric liquid crystal cells, one between each pair of polarizers, and birefringent elements between each of said ferroelectric crystal cells and one of said polarizers.

28. A system as in claim 14, wherein said linear polarizer means comprises only two, and no more, linear polarizers.

29. A system as in either of claims 1 or 12 wherein said ferroelectric liquid crystal color-selective filter means comprises an electrical driving means which independently switches two ferroelectric liquid crystal cell means such that three of the four possible switching states represent said predetermined colors, and in series therewith: a first linear polarizer means for passing only those components of light polarized parallel to a first plane of polarization; a first of said ferroelectric liquid crystal cell means oriented with one of said optic axis states parallel to said first plane of polarization; and a second of said ferroelectric liquid crystal cell means oriented with one of said optic axis states parallel to said first plane of polarization; a second linear polarizer means for passing only those components of light polarized parallel to said first plane of polarization.

30. A system as in any of claims 1, 9 or 12 further comprising diffuser element means, at a filter input, for providing uniform spatial intensity of illumination.

31. A system as in any of claims 1, 9 or 12 wherein each of said ferroelectric liquid crystal color-selective filter means include a surface stabilized ferroelectric liquid crystal compound, and have two voltage controllable optic axis states between which they are switchable and separated by substantially 45°.

32. A system as in claim 31 wherein thicknesses of the liquid crystal layers in each of said ferroelectric liquid crystal color-selective filter means are such that for a white light illumination, the three colors of red, green and blue are sequentially produced from said color-selective filter means, for a unique combination of optic axis states of said ferroelectric liquid crystal color-selective filter means, for each color produced.

33. A system as in claim 32 wherein a first optic axis state in each of said ferroelectric liquid crystal color-selective filter means is parallel to said first plane of polarization, and a second optic axis state in each of said ferroelectric liquid crystal color-selective filter means is substantially at 45° to said first plane of polarization.

34. A system as in claim 33 wherein thicknesses of said ferroelectric liquid crystal color-selective filter means are substantially 4950 nm and 2650 nm respectively; the color red is observed with the optic axis state of a first of said liquid crystal color-selective filter means being at 45° to said first plane of polarization, and the optic axis state of a said second of said liquid crystal cell means being parallel to said first plane of polarization; the color green is observed with the optic axis states of said first and second liquid crystal cell means being at 45° to said first plane of polarization; the color blue is observed with the optic axis state of said first liquid crystal cell means being parallel to said first plane of polarization, and the optic axis state of said second liquid crystal cell means being at 45° to said first plane of polarization.

35. A system as in claim 34 further comprising a color filter which absorbs in the violet color range.

36. A system as in claim 1 or 12 wherein said color-selective filter means comprises an electrical driving means which independently switches two ferroelectric liquid crystal cells, and in serial association: a first linear polarizer means for passing only those components of light polarized parallel to a first plane of polarization; a first of said ferroelectric liquid crystal cells oriented with one of said optic axis states parallel to said first plane of polarization; a first birefringent element oriented with its optic axis at 45° to said first plane of polarization; a second linear polarizer for passing only those components of light polarized parallel to said first plane of polarization; a second ferroelectric liquid crystal cell oriented with one of said optic axis states parallel to said first plane of polarization; a second birefringent element oriented with its optic axis parallel to said optic axis of said first birefringent element means; and a third linear polarizer for passing only those components of light polarized parallel to said first plane of polarization.

37. A system as in claim 36 wherein the thicknesses of said first and second ferroelectric liquid crystal cells are substantially 2000 nm and 1500 nm respectively; the optical thicknesses of said first and second birefringent elements are substantially 690 nm and 1380 nm respectively; the color red may be observed with the optic axis states of said first and second liquid crystal cell means being parallel to said first plane of polarization; the color green may be observed with the optic axis state of said first and second liquid crystal cell means being parallel to said optic axis of said first birefringent element means; the color blue may be observed with the optic axis state of said first liquid crystal cell means being parallel to said optic axis of said first birefringent element means, and the optic axis state of said second liquid crystal cell means being parallel to said first plane of polarization.

38. A system as in claim 36 wherein the thicknesses of said first and second ferroelectric liquid crystal cells are substantially 2000 nm and 4500 nm respectively; the optical thicknesses of said first and second birefringent elements are substantially 975 nm and 1380 nm respectively; the color red may be observed with the optic axis states of said first and second liquid crystal cell means being parallel to said first plane of polarization; the color green may be observed with the optic axis state of said first and second liquid crystal cell means being parallel to said optic axis of said first birefringent element means; the color blue may be observed with the optic axis state of said first liquid crystal cell means being parallel to said optic axis of said first birefringent element means, and the optic axis state of said second liquid crystal cell means being parallel to said first plane of polarization.

39. A system as in claim 26 wherein the thicknesses of said first and second ferroelectric liquid crystal cells are substantially 1500 nm and 2400 nm respectively; the optical thicknesses of said first and second birefringent elements are substantially 1850 nm and 965 nm respectively; the color red may be observed with the optic axis states of said first and second liquid crystal cell means being parallel to said first plane of polarization; the color green may be observed with the optic axis state of said first and second liquid crystal cell means being parallel to said optic axis of said first birefringent element means; the color blue may be observed with the optic axis state of said first liquid crystal cell means being parallel to said optic axis of said first birefringent element means, and the optic axis state of said second liquid crystal cell means being parallel to said first plane of polarization.

40. A system as in claim 36 further comprising a colored filter means which absorbs light of violet wavelengths, disposed in front of said first linear polarizer means, and wherein the thicknesses of said first and second ferroelectric liquid crystal cell means are substantially 1900 nm and 4600 nm respectively; the optical thicknesses of said first and second birefringent means are substantially 690 nm and 1380 nm respectively; the color red may be observed with the optic axis states of said first and second liquid crystal cell means being parallel to said first plane of polarization; the color green may be observed with the optic axis state of said first and second liquid crystal cell means being parallel to said optic axis of said first birefringent element means; the color blue may be observed with the optic axis state of said first liquid crystal cell means being parallel to said optic axis of said first birefringent element means, and the optic axis state of said second liquid crystal cell means being parallel to said first plane of polarization.

41. A system as in claim 36 wherein the thicknesses of said first and second ferroelectric liquid crystal cell means are substantially 1800 nm and 1700 nm respectively; the optical thicknesses of said first and second birefringence means are substantially 690 nm and 1380 nm respectively; the color red may be observed with the optic axis states of said first and second liquid crystal cell means being parallel to said first plane of polarization; the color green may be observed with the optic axis state of said first liquid crystal cell means being parallel to said optic axis of said first birefringent element means, and the optic axis state of said second liquid crystal cell means being orthogonal to said optic axis of said first birefringent element means; the color blue may be observed with the optic axis state of said first liquid crystal cell means being parallel to said optic axis of said first birefringent element means, and the optic axis of said second liquid crystal cell means being parallel to said first plane of polarization.

42. A system as in claim 36 further comprising a colored filter means which absorbs light of violet wavelengths, disposed in front of said first linear polarizer means, and wherein the thicknesses of said first and second ferroelectric liquid crystal cell means are substantially 1800 nm and 4500 nm respectively; the optical thicknesses of said first and second birefringence means are substantially 975 nm and 1380 nm respectively; the color red may be observed with the optic axis state of said first liquid crystal cell means being orthogonal to said optic axis of said first birefringent element means, and the optic axis state of said second liquid crystal cell means being parallel to said first plane of polarization; the color green may be observed with the optic axis state of said first liquid crystal cell means being parallel to said first plane of polarization, and the optic axis of said second liquid crystal cell means being parallel to said optic axis of said first birefringent element means; the color blue may be observed with the optic axis states of said first and second liquid crystal cell means being parallel to said first plane of polarization.

43. A system as in claim 36 further comprising a colored filter means which absorbs light of violet wavelengths, disposed in front of said first linear polarizer means, and wherein the thicknesses of said first and second ferroelectric liquid crystal cell means are substantially 1200 nm and 5200 nm respectively; the optical thicknesses of said first and second birefringence means are substantially 900 nm and 1350 nm respectively; the color red may be observed with the optic axis state of said first liquid crystal cell means being orthogonal to said optic axis of said first birefringent element means, and the optic axis state of said second liquid crystal cell means being parallel to said first plane of polarization; the color green may be observed with the optic axis state of said first liquid crystal cell means being parallel to said first plane of polarization, and the optic axis of said second liquid crystal cell means being orthogonal to said optic axis of said first birefringent element means; the color blue may be observed with the optic axis states of said first and second liquid crystal cell means being parallel to said first plane of polarization.

44. A system as in claim 36 wherein the thicknesses of said first and second ferroelectric liquid crystal cell means are substantially 1800 nm and 2000 nm respectively; the optical thicknesses of said first and second birefringence means are substantially 1890 nm and 960 nm respectively; the color red may be observed with the optic axis state of said first liquid crystal cell means being parallel to said first plane of polarization, and the optic axis state of said second liquid crystal cell means being orthogonal to said optic axis of said first birefringent element means; the color green may be observed with the optic axis state of said first liquid crystal cell means being orthogonal to said optic axis of said first birefringent element means; and the optic axis state of said second liquid crystal cell means being parallel to said first plane of polarization, the color blue may be observed with the optic axis states of said first and second liquid crystal cell means being parallel to said first plane of polarization.

45. A system as in either of claims 1 or 12 wherein said monochrome video means is reflective and color images are viewed by reflection from said frame-sequential video system.

46. A system as in either of claims 1 or 12 wherein said monochrome video means is transmissive and color images are viewed by transmission through said frame-sequential video system.

47. A system as in either of claims 1 or 12 wherein said monochrome video means is emissive and color images are viewed by emission from said frame-sequential video system.

48. A system as in either of claims 1 or 12 wherein said monochrome video means is a monochrome video display.

49. A system as in either of claims 1 or 12 wherein said monochrome video means is a monochrome video camera.

50. A system as in any of claims 1, 9, or 12, further comprising driving means for producing said driving signal, said driving means producing an average zero voltage by driving the ferroelectric crystal liquid color-selective filter means at a first predetermined magnitude when the voltage has a first polarity and then at a second predetermined magnitude when the voltage has a second polarity, the magnitudes being related such that $v_1 \cdot t_1 = v_2 \cdot t_2$, where $v_1$ is the magnitude at the first polarity and $t_1$ is the time during which the driving signal remains at the first polarity and $v_2$ is the voltage at the second polarity, $t_2$ being the time during which the driving signal remains at the second polarity.

51. A frame-sequential color video display system comprising:
a monochrome video display which is driven by video source information to produce an image in monochrome, single colored but multi-wavelength light; and
a ferroelectric liquid crystal color-selective filter means optically in series with said monochrome video display, for selectively interfering with light of predetermined wavelengths which represent predetermined colors, to pass only predetermined colors of said light, based on a driving signal.

52. A frame-sequential color video system comprising:
a monochrome video camera, which receives and detects a multiwavelength light image to produce a corresponding video signal; and
a ferroelectric liquid crystal color-selective filter optically in series with said monochrome video camera, operating to selectively interfere with light of predetermined wavelengths which represent predetermined colors, to pass only predetermined colors of said light image to be detected by said monochrome video camera, based on a driving signal.

* * * * *